(12) United States Patent
Smith

(10) Patent No.: US 6,820,154 B2
(45) Date of Patent: Nov. 16, 2004

(54) SYSTEM AND METHOD FOR SERVICING INTERRUPTS

(75) Inventor: Orden E. Smith, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 428 days.

(21) Appl. No.: 09/947,303

(22) Filed: Sep. 5, 2001

(65) Prior Publication Data

US 2003/0046465 A1 Mar. 6, 2003

(51) Int. Cl.[7] .................................................. G06F 9/48
(52) U.S. Cl. ....................... 710/260; 718/100; 713/323; 370/910
(58) Field of Search ................................. 710/260, 266, 710/268; 718/100–102; 707/100; 713/323; 709/202; 370/910

(56) References Cited

U.S. PATENT DOCUMENTS

| | | | | |
|---|---|---|---|---|
| 4,448,680 A | * | 5/1984 | Wilks et al. | ................ 209/564 |
| 5,297,276 A | * | 3/1994 | Millar et al. | ................ 713/601 |
| 6,304,610 B1 | * | 10/2001 | Monson | ....................... 375/259 |
| 6,687,903 B1 | * | 2/2004 | Chalmer et al. | ............ 718/100 |

OTHER PUBLICATIONS

"The temporal specification technique for operating systems mechanisms " by A. Hoppe (abstract only).*
"Region–based Petri nets for modeling interrupts and cancellations" by J. Borkowski (abstract only).*

* cited by examiner

Primary Examiner—Gopal C. Ray
(74) Attorney, Agent, or Firm—Blakely, Sokoloff, Taylor & Zafman LLP

(57) ABSTRACT

Disclosed are a system and method of selectively awaking processes in response to an interrupt condition. A processing system may host a plurality of processes where each process is associated with an event causing an interrupt condition at a device. When a process transitions to a sleeping state, an identifier of the process may be associated with an address in a data structure. In response to an event at the device causing an interrupt condition, an interrupt service routine may associate data received from the device with the identifier in the data structure to locate the sleeping process. The located process may then be awakened while maintaining other sleeping processes associated with other events in a sleeping state.

28 Claims, 4 Drawing Sheets

//2// # SYSTEM AND METHOD FOR SERVICING INTERRUPTS

BACKGROUND

1. Field

The subject matter disclosed herein relates to processing systems. In particular, the subject matter disclosed herein relates to processing systems which respond to interrupt conditions.

2. Information

Real-time processing systems typically manage finite processing resources to execute processes. For example, a real-time processing typically comprises a limited throughput processor and limited memory which is to be shared among multiple processes to execute multiple tasks in a multi-tasked processing environment. Such processes may, from time to time, be placed in a sleeping state until needed for processing data in response to events.

Some real-time processing systems respond to interrupt conditions caused by events at external devices. In response to the interrupt condition, a processing system may execute an interrupt service routine. The interrupt service routine may they execute one or more processes to respond to one or more events causing an underlying interrupt condition. This may include, for example, awakening all processes associated with the interrupt condition caused by a single event.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
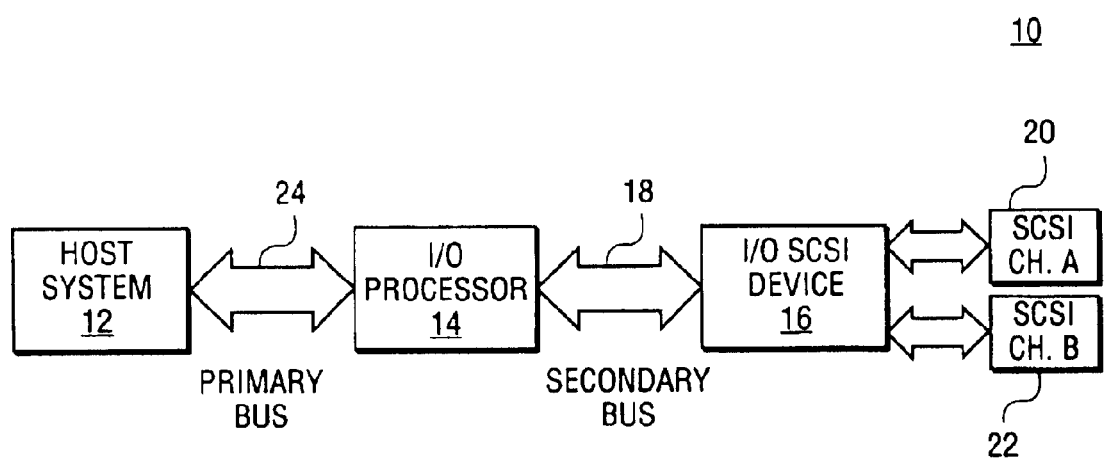
FIG. 1 shows a schematic diagram of a processing platform according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations one or more data objects. However, this is merely an example of machine-readable instructions and embodiments of the present invention are not limited in this respect.

"Machine-readable medium" as referred to herein relates to media capable of maintaining expressions which are perceivable by one or more machines. For example, a machine readable medium may comprise one or more storage devices for storing machine-readable instructions. However, this is merely an example of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise processing circuitry in combination with machine-executable instructions stored in a memory. However, these are merely examples of structures which may provide logic and embodiments of the present invention are not limited in this respect.

A "device" as referred to herein relates to a structure comprising logic defining one or more system states. An "event" as referred to herein relates to a transaction which is detectable at a device. For example, an event may be detected upon a change in a system state defined at the device. However, these are merely examples of a device and event, and embodiments of the present invention are not limited in these respects.

A "processing system" as discussed herein relates to a combination of hardware and software resources for accomplishing computational tasks. However, embodiments of the present invention are not limited in this respect. A "host processing system" relates to a processing system which may be adapted to communicate with a "peripheral device." For example, a peripheral device may provide inputs to or receive outputs from an application process hosted on the host processing system. However, these are merely examples of a host processing system and peripheral device, and embodiments of the present invention are not limited in these respects.

A "data bus" as referred to herein relates to circuitry for transmitting data between devices. For example, a data bus may transmit data between a host processing system and a peripheral device. However, this is merely an example of data bus and embodiments of the present invention are not limited in this respect. A "bus transaction" as referred to herein relates to an interaction between devices coupled in a bus structure wherein one device transmits data addressed to the other device through the bus structure.

A "process" as referred to herein relates to one or more related machine-readable instructions that, when executed, perform one or more operations on data. For example, a process may comprise machine-readable instructions which are executed to perform one or more operations on data in response to an interrupt signal. Also, multiple processes may comprise instances of a common encoded function or procedure such as a device driver. However, these are merely examples of a process and embodiments of the present invention are not limited in this respect.

An "interrupt signal" as referred to herein relates to a signal informing a processing system that a certain event has occurred or condition exists. For example, a device may transmit an interrupt signal to a processing system in response to detecting an event at the device. However, this is merely an example of an interrupt signal and embodiments of the present invention are not limited in this respect. An "interrupt condition" as referred to herein relates to a condition detected at a processing system which may be initiated upon receipt of an interrupt signal from a device. For example, an interrupt condition may be brought about by any of a plurality of events detected at a device. However, this is merely an example of an interrupt condition and embodiments of the present invention are not limited in this respect.

An "interrupt vector" as referred to herein relates to a data structure comprising a pointer to an interrupt service routine stored in a memory. For example, an interrupt vector may comprise an interrupt service routine memory address stored in a predetermined location in a memory. However, this is merely an example of an interrupt vector and embodiments of the present invention are not limited in this respect.

A processes executing on a processing system may be in a "sleep" or "sleeping" state such that execution of the process is suspended. Upon a process entering the sleep or sleeping state, a processing system may store data defining one or more states of the process in a memory of the processing system. Upon "awakening" a sleeping process, a processing system may retrieve the data defining one or more states of the process and resume execution of the process at the stored state. However, these are merely examples of how a process may be transitioned to a sleeping state and an awakened state, and embodiments of the present invention are not limited in these respects.

An "identifier" as referred to herein relates to a symbol that relates to an entity such as a data item or process. Such a symbol may be expressed in a machine-readable medium. Also, a process may be associated with a "unique" identifier that distinguishes the process from other process. However, these are merely examples of an identifier and embodiments of the present invention are not limited in these respects.

A "data structure" as referred to herein relates to an association of data items in a logical structure. For example, a data structure may comprise an association with identifiers with other information relating to entities. Such a data structure may be expressed in a machine-readable medium. However, these are merely examples of a data structure and embodiments of the present invention are not limited in these respects.

Briefly, an embodiment of the present invention is directed to a system and method of selectively awaking processes in response to an interrupt condition. A plurality of processes may be hosted on a processing system where each process is associated with an event causing an interrupt condition at a device. In response to an event at the device causing an interrupt condition, an interrupt service routine may associate data received from the device with an identifier to locate a sleeping process. The located process may then be awakened while maintaining other sleeping processes associated with other events in a sleeping state. However, this is merely an example embodiment and other embodiments of the present invention are not limited in these respects.

FIG. 1 shows a schematic diagram of a processing platform 10 according to an embodiment of the present invention. A host processing system 12 may be coupled to a peripheral device 14 through a data bus 24. The peripheral device 14 may also be coupled to the host processing system 12 to provide interrupt signals in response to events at the peripheral device 14. Such an event may be any one of a plurality of events being detected at the peripheral device 14. Similarly, an input/output (I/O) device 16 may be coupled to the peripheral device 14 to provide an interrupt signal to the peripheral device 14 in response to events at the I/O device 16. However, these are merely examples of devices which may transmit an interrupt signal to a processing system in response to events and embodiments of the present invention are not limited in these respects.

According to an embodiment, the primary and secondary busses 24 and 18 may be formed according to a PCI data bus structure such as that described in the PCI Local Bus Specification, Rev. 2.2, Dec. 18, 1998 published by the PCI Special Interest Group (hereinafter the "PCI Local Bus Specification"). However, this is merely an example of a bus structure which may be employed in a data bus to transmit data between devices and embodiments of the present invention are not limited in this respect.

In the illustrated embodiment, the peripheral device 14 may comprise an input/output (I/O) processor coupled to an I/O device 16 having an interface to I/O channels 20 and 22 according to variations of the Small Computer System Interface (SCSI) established by the National Committee for Information Technology Standards (NCITS) to enable communication through first and second I/O channels 20 and 22. However, this is merely an example of a device to facilitate communication with I/O channels according to a format and other embodiments may be adapted to communicate with I/O channels of different formats such as, for example, Fibre-Channel, SSA, IBA or Ethernet. Each of the I/O channels 20 and 22 may be adapted to communicate with any one of several I/O devices such as, for example, a storage system such as a Redundant Array of Independent Disks (RAID), a communication port, a server, a client or other storage system directly or via a switch.

In the illustrated embodiment, the peripheral device 14 may detect events from data received from the I/O device 16 which may give rise to an interrupt condition at the peripheral device 14. Such events may include, for example, receipt of data through an I/O channel 20 or 22. Also, the peripheral device 14 may detect events from data received from the host processing system 12 which may give rise to an interrupt condition at the peripheral device 14. Such an event may comprise a request for data storage or retrieval through the I/O device 16. Also, the host processing system 12 may detect events from data received from the peripheral device 14 or an application giving rise to an interrupt condition at the host processing system 12. However, these are merely examples of events at a device which may give rise to an interrupt condition at a processing system and embodiments of the present invention are not limited in these respects.

In response to detecting an event, a device may transmit data to a processing system (e.g., the host processing system 12 or peripheral device 14) through a data bus (e.g., data bus 24 or data bus 18) to be stored in a data buffer accessible by the processing system (e.g., a data buffer related to an interrupt condition at the processing system) and transmit an interrupt signal to the processing system to initiate an interrupt condition at the processing system. In response to the interrupt signal, the processing system may execute an interrupt service routine related to the interrupt condition to process data such as, for example data received in the data buffer. However, this is merely an example of how a processing system may respond to an interrupt condition and embodiments of the present invention are not limited in this respect.

According to an embodiment of the present invention, an interrupt service routine may respond to an interrupt condition at a processing system by initiating execution of one or more processes related to an event at a device. The interrupt service routine may associate a particular process to be executed in response to an interrupt signal based upon, for example, data received in a data buffer from the device. Such data may comprise information indicating the event causing the underlying interrupt condition or identifier information associated with a particular process to be executed. However, these are merely examples of how an interrupt service routine may respond to an interrupt signal and embodiments of the present invention are not limited in these respects.

According to an embodiment, a process to be executed by an interrupt service routine in response to an interrupt condition may comprise an instance of an encoded function or procedure related to the interrupt condition. More than one process may each comprise an instance of a common encoded function or procedure (e.g., device driver) stored in a memory of a processing system at an address. However, distinct processes associated with a common encoded function or procedure may be associated with distinct events or conditions at a device, and comprise distinct system states. In the embodiment illustrated with reference to FIG. 1, for example, multiple processes hosted on the peripheral device 14 may be associated with distinct events at the host processing system 12 which result in requests for data through an I/O channel 20 or 22. Such processes may comprises distinct instances of a common device driver hosted on the peripheral device 14 where each instance responds to a corresponding event (e.g., web browser request for data storage or retrieval or any other request for data storage or retrieval initiated by a user input or external device) at the host processing system 12. However, these are merely examples of processes which may be executed in response to an interrupt condition and embodiments of the present invention are not limited in these respects.

According to an embodiment, after a process has been created (e.g., the creation of an instance of a device driver), the process may be placed in a sleeping state. For example, a processing system may transition a process comprising an instance of a device driver to a sleeping state by, for example, de-allocating resources to the instance and/or storing data defining one or more states of the instance in a memory location accessible by the processing system. The processing system may cause a process to be transitioned to a sleep up detection of a condition such as, for example, the absence of execution of the process over a period of time. However, these are merely examples of how a process may be transitioned to a sleeping state and embodiments of the present invention are not limited in these respects.

According to an embodiment of the present invention, a plurality of processes may be associated with an interrupt condition and an interrupt service routine may selectively awaken one or more of these processes from a sleeping state in response to the interrupt condition. However, depending on the underlying event resulting in the interrupt condition, not all of the associated processes may be required to respond to the interrupt condition. If processes associated with the interrupt condition are in a sleeping state, the interrupt service routine may awaken only the process or processes related to the underlying event while maintaining any other sleeping processes associated with the interrupt condition in a sleeping state. However, this is merely an example of how an interrupt service routine may selectively awaken processes in response to an interrupt condition and embodiments of the present invention are not limited in this respect.

Figure 2:
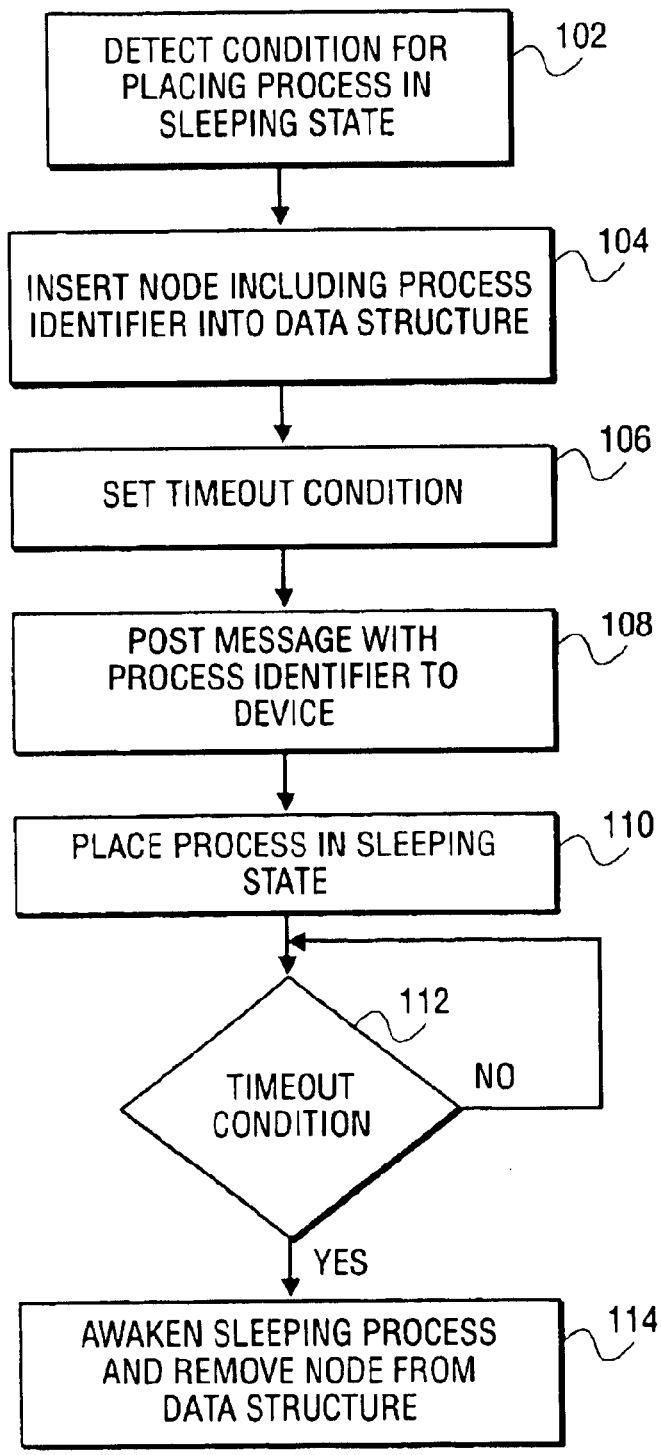
FIG. 2 shows a flow diagram illustrating a procedure for placing a process in a "sleep" state and transitioning to an "awake" state according to an embodiment of the present invention.

FIG. 2 shows a flow diagram illustrating a procedure 100 executed by a processing system for placing a process in a sleeping state, and transitioning the sleeping process to an awakened state according to an embodiment of the present invention. Block 102 detects a condition or an event for placing a process in a sleeping state such as, for example, an absence of execution of the process over a period of time or the unavailability of resources available to the process to service interrupt requests. At block 104, a node is inserted in a data structure to associate an identifier of the process and a location of data to be accessed upon awakening. Block 106 sets a timeout condition to awaken the process if not otherwise awakened in response to an interrupt condition.

Contemporaneously with the process being placed in a sleeping state at block 110, block 108 may post a message to a device associated with the process. This message may provide an identifier of the process (e.g., as indicated by the data structure in the node inserted at block 104) to a device or otherwise provide information to associate related events to the process. However, this is merely an example of how a device may receive information relating to processes transitioning to a sleeping state and embodiments of the present invention are not limited in this respect.

The sleeping process may be awakened if the timeout condition (set at block 106) is reached at diamond 112. This condition may be detected by an interrupt service routine associated with the sleeping process or by logic as part of an operating system. However, this is merely an example of how a sleeping process may be awakened when a timeout condition is reached and embodiments of the present invention are not limited in this respect.

While the process transitioned to the sleeping state at block 104 may be awakened at block 114 upon reaching the timeout condition at diamond 112, the sleeping process may also be awakened in response to an interrupt condition before the timeout condition is reached. In response to the interrupt condition, for example, an interrupt service routine may associate the interrupt condition with the sleeping process as indicated in the data structure by insertion of the node at block 104. Upon detecting an event to initiate the interrupt condition, the device may provide data identifying the sleeping process or a particular event associated with the sleeping process (e.g., initiating a bus transaction to write to a data buffer which is accessible by the interrupt service routine). The interrupt service routine may then locate data associated with the identifier at the node in the data structure (inserted at block 104), and awaken the process using the data associated with the identifier. Accordingly, the interrupt service routine may selectively awaken a process to be executed in response to the interrupt condition based upon information from the device detecting the underlying event and need not awaken each sleeping process associated with the interrupt condition. However, this is merely an example of how an interrupt service routine may selectively awaken a sleeping process and embodiments of the present invention are not limited in this respect.

Figure 3:
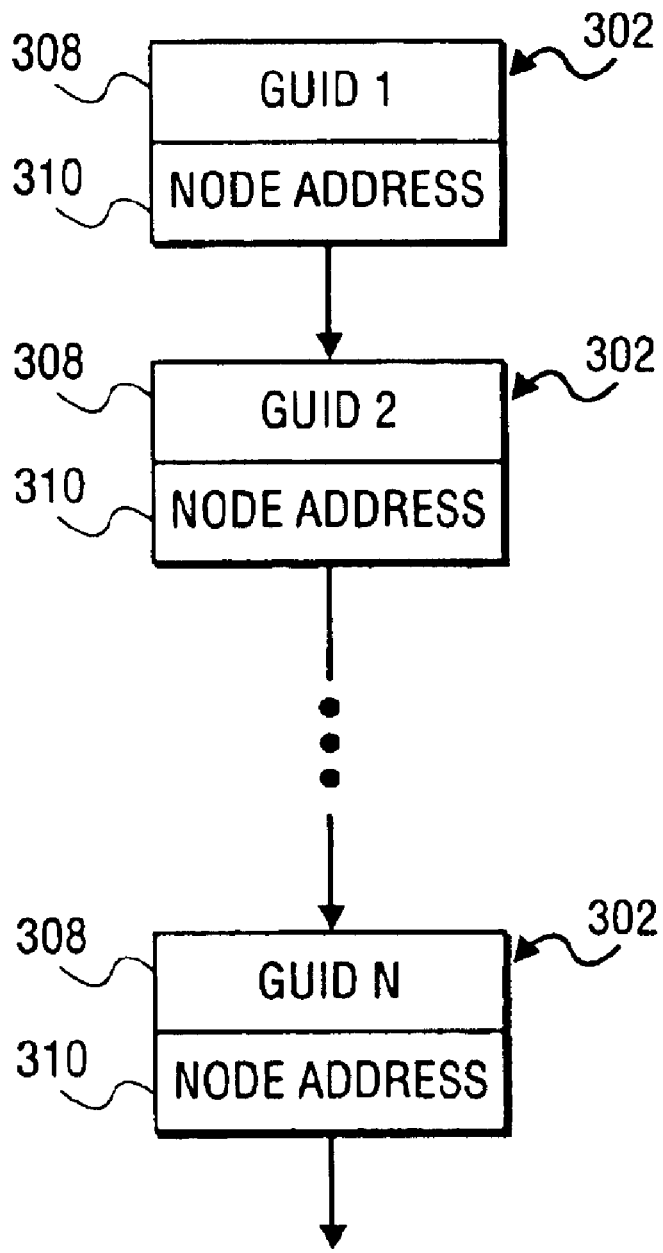
FIG. 3 shows a data structure to associate identifiers of sleeping processes with node addresses according to an embodiment of the present invention.

FIG. 3 shows a data structure 300 to associate identifiers of sleeping processes with node addresses according to an embodiment of the present invention illustrated with reference to FIG. 2. The data structure 300 may comprise a linked list in a memory such that elements 302 corresponding with processes which are in a sleeping state. In the illustrated embodiment, each element 302 may be inserted in the linked list in response to a process being transitioned to a sleeping state, and removed from the linked list in response to the process being awakened. However, this is merely an example of a data structure which may associate information relating to sleeping processes and embodiments of the present invention are not limited in this respect.

Each element 302 may comprise a globally unique identifier (GUID) 308 associated with a sleeping process and a node address 310. In the illustrated embodiment, an interrupt service routine may access the data structure 300 in response to an interrupt condition to awaken a sleeping process identified in one of the elements 302. For example, the interrupt service routine may access information in response to the interrupt condition (e.g., in data provided by a device detecting the underlying event resulting in the interrupt condition) which identifies the event or related sleeping process. The interrupt service routine may then associate this information with a GUID 308 of the sleeping process to locate a corresponding node address 310. The interrupt service routine may then retrieve data located in a memory at the node address 310 to awaken the sleeping process by, for example, re-initializing the sleeping process with data retrieved at the node address 310. However, this is merely an example of how an interrupt service routine may access a data structure to retrieve data and awaken a sleeping process, and embodiments of the present invention are not limited in this respect.

Figure 4:
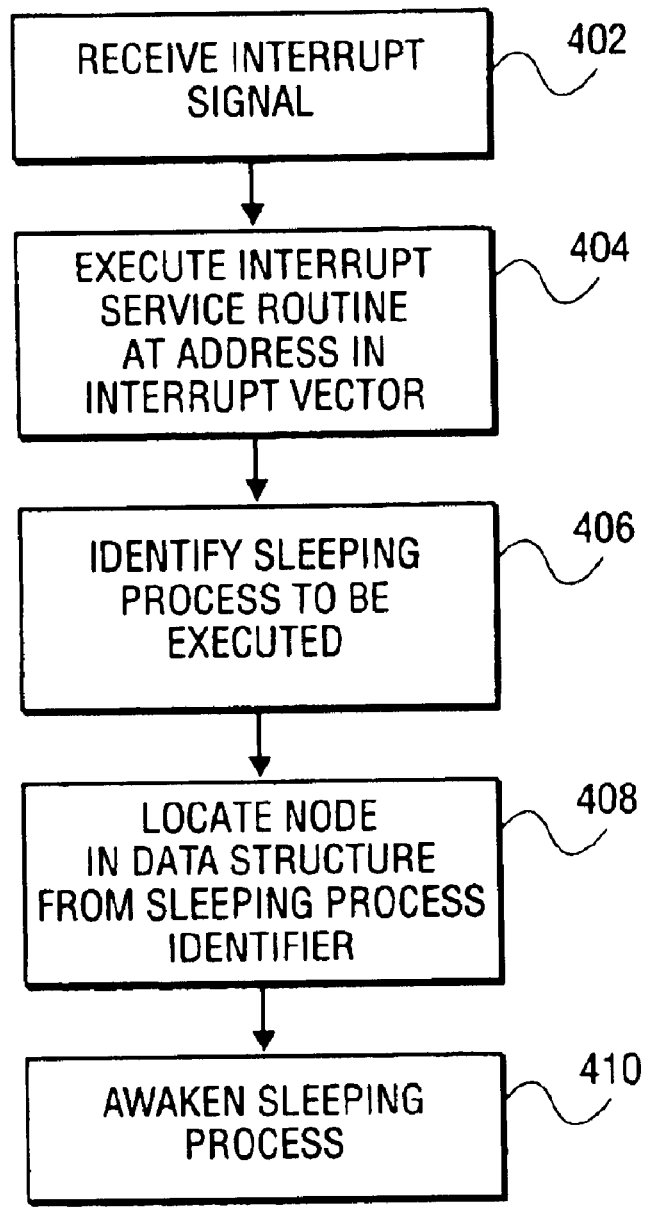
FIG. 4 shows a flow diagram illustrating an execution of an interrupt service routine in response to an interrupt signal according to an embodiment of the present invention.

FIG. 4 shows a flow diagram illustrating an execution of an interrupt service routine by a processing system in response to an interrupt signal according to an embodiment of the present invention illustrated with reference to FIG. 3. In the illustrated embodiment, the processing system may receive an interrupt signal from a device at block 402 and execute an interrupt service routine indicated in an interrupt vector at block 404. Upon retrieving data from the device stored in a data buffer, the interrupt service routine 400 may determine an identifier of a process to be executed in response to the interrupt condition. For example, the data retrieved from the data buffer may comprise an identifier of the process as passed to the device when the process was transitioned to a sleeping state. Alternatively, the retrieved data indicates the type of event at the device causing the interrupt signal and determines the identifier from the type of event.

In the illustrated embodiment, the process identified at block 406 is in a sleeping state. However, it should be understood that in other situations the identified process may already be in an awakened state. Based upon the event causing the interrupt condition or information identifying a sleeping process, block 408 may locate an element in a data structure comprising a node address of the sleeping process. The interrupt service routine may then retrieve data from a memory at the node address and awaken the sleeping process by initiating execution of the sleeping process with the retrieved data at block 410. However, this is merely an example of how an interrupt service routine may awaken a sleeping process in response to an interrupt condition and embodiments of the present invention are not limited in these respects.

Since the interrupt service routine may determine particular processes to be executed in response to an interrupt condition, only selected processes associated with a particular event may be awakened while other sleeping processes associated with the interrupt condition may be maintained in a sleeping state.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:
   hosting a plurality of processes on a processing system, each process being associated with an event at a device;
   associating an identifier of at least one of said processes with an address in a data structure contemporaneously with putting the at least one process in a sleeping state;
   detecting an interrupt condition associated with an event at a device associated with the at least one process;
   locating the identifier in the data structure based upon data received from the device associated with the at least one process in response to the interrupt condition; and
   initializing execution of the sleeping process based upon data associated with the identifier located in the data structure while maintaining at least one other of said processes associated with other events in a sleeping state.

2. The method of claim 1, the method further comprising setting a timeout condition for awakening the at least one process.

3. The method of claim 1, the method further comprising:
   de-allocating resources of the processing system from the at least one process contemporaneously with putting the at least one process in a sleeping state; and
   storing a state of the at least one process in a memory associated with the address associated in the data structure with the identifier.

4. The method of claim 1, wherein the method further comprises removing the identifier from the data structure contemporaneously with awakening the at least one process from a sleeping state.

5. The method of claim 1, the method further comprising transmitting the identifier to the device contemporaneously with putting the at least one process in a sleeping state.

6. The method of claim 5, the method further comprising:
   detecting the interrupt condition upon receipt of an interrupt signal from the device associated with the at least one process; and
   retrieving data comprising the identifier from a data buffer in response to the interrupt signal.

7. An article comprising:
   a machine-readable medium comprising machine-readable instructions stored thereon for:
   associating each of a plurality of processes with an event associated with one or more devices;
   associating an identifier of at least one process with an address in a data structure contemporaneously with putting the at least one process in a sleeping state, the at least one process being associated with an event at a device;
   locating the identifier in the data structure based upon data from the device associated with the at least one process in response to an interrupt condition; and
   initializing execution of the sleeping process based upon data associated with the identifier located in the data structure while maintaining at least one other of said processes associated with other events in a sleeping state.

8. The article of claim 7, wherein the machine-readable medium further comprises machine-readable instructions stored thereon for setting a timeout condition for awakening the at least one process.

9. The article of claim 7, wherein the machine-readable medium further comprises machine-readable instructions stored thereon for:
   de-allocating resources of a processing system from the at least one process contemporaneously with putting the at least one process in a sleeping state; and
   storing a state of the at least one process in a memory associated with the address associated in the data structure with the identifier.

10. The article of claim 7, wherein the machine-readable medium further comprises machine-readable instructions stored thereon for removing the identifier from the data structure contemporaneously with awakening the process.

11. The article of claim 7, wherein the machine-readable medium further comprises machine-readable instructions stored thereon for initiating transmission of the identifier to the device contemporaneously with putting the at least one process in a sleeping state.

12. The article of claim 11, wherein the machine-readable medium method further comprises machine-readable instructions stored thereon for:
   detecting the interrupt condition upon receipt of an interrupt signal from the device; and
   retrieving data comprising the identifier from a data buffer in response to the interrupt signal.

13. A processing system comprising:
   logic to associate an identifier of at least one process with an address in a data structure contemporaneously with putting the process in a sleeping state, the at least one process being associated with an event at a device;
   a circuit to receive an interrupt signal from the device to initiate an interrupt condition, the interrupt signal being responsive to the event at the device;
   logic to locate the identifier in the data structure based upon data from the device in response to the interrupt signal; and
   logic to initialize execution of the sleeping process based upon data associated with the identifier located in the data structure while maintaining at least one other process associated with one or more other events in a sleeping state.

14. The processing system of claim 13, the processing system further comprising logic to set a timeout condition for awakening the at least one process.

15. The processing system of claim 13, the processing system further comprising:
   logic to de-allocate resources of the processing system from the at least one process contemporaneously with putting the at least one process in the sleeping state; and
   logic to store a state of the at least one process in a memory associated with the address associated in the data structure with the identifier.

16. The processing system of claim 13, wherein the processing system further comprises logic to remove the identifier from the data structure contemporaneously with awakening the sleeping process.

17. The processing system of claim 13, the processing system further comprising logic to initiate transmission of the identifier to the device upon putting the at least one process in a sleeping state.

18. The processing system of claim 17 the processing system further comprising:
   logic to detect the interrupt condition upon receipt of an interrupt signal from the device; and
   logic to retrieve data comprising the identifier from a data buffer in response to the interrupt signal.

19. A system comprising:
   a device;
   a data bus; and
   a host processing system coupled to the device through the data bus, the host processing system comprising:
      logic to associate an identifier of at least one process with an address in a data structure contemporaneously with putting the process in a sleeping state, the at least one process being associated with an event at the device;
      a circuit to receive an interrupt signal from the device to initiate an interrupt condition, the interrupt signal being responsive to the event at the device;
      logic to locate the identifier in the data structure based upon data from the device in response to the interrupt signal; and
      logic to initialize execution of the sleeping process based upon data associated with the identifier located in the data structure while maintaining at least one other process associated with one or more other events in a sleeping state.

20. The system of claim 19 wherein the host processing system further comprises logic to set a timeout condition for awakening the at least one process.

21. The system of claim 19, wherein the host processing system further comprises:
   logic to de-allocate resources of the host processing system from the at least one process contemporaneously with putting the at least one process in a sleeping state; and
   logic to store a state of the at least one process in a memory at the address associated in the data structure with the identifier.

22. The system of claim 19, wherein the processing system further comprises logic to remove the identifier from the data structure contemporaneously with awakening the sleeping process.

23. The system of claim 19, wherein the host processing system further comprises logic to initiate transmission of the identifier to the device contemporaneously with putting the at least one process in a sleeping state.

24. The system of claim 23, wherein the host processing system further comprises:
   logic to detect the interrupt condition upon receipt of an interrupt signal from the device; and
   logic to retrieve data comprising the identifier from a data buffer in response to the interrupt signal.

25. The system of claim 19, wherein the device is couple to a Redundant Array of Independent Disks.

26. The system of claim 19, wherein the device comprises a Small Computer System Interface.

27. The system of claim 19, wherein the device is adapted to communicate with an I/O channel according to a Fibre-Channel format.

28. The system of claim 19, wherein the device is adapted to communicate with an I/O channel according to an Ethernet format.

* * * * *